United States Patent
Dabirian et al.

(10) Patent No.: US 11,247,145 B2
(45) Date of Patent: Feb. 15, 2022

(54) GAS—LIQUID FLOW SPLITTING (GLFS) SYSTEM

(71) Applicant: The University of Tulsa, Tulsa, OK (US)

(72) Inventors: Ramin Dabirian, Tulsa, OK (US); Srinivas Swaroop Kolla, Tulsa, OK (US); Ram S. Mohan, Broken Arrow, OK (US); Ovadia Shoham, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 289 days.

(21) Appl. No.: 16/216,634

(22) Filed: Dec. 11, 2018

(65) Prior Publication Data

US 2019/0176058 A1 Jun. 13, 2019

Related U.S. Application Data

(60) Provisional application No. 62/598,096, filed on Dec. 13, 2017.

(51) Int. Cl.
*B01D 19/00* (2006.01)
*B01D 45/16* (2006.01)
(Continued)

(52) U.S. Cl.
CPC ..... *B01D 19/0057* (2013.01); *B01D 19/0042* (2013.01); *B01D 19/0063* (2013.01);
(Continued)

(58) Field of Classification Search
CPC .... B01D 19/0042; B01D 45/16; B01D 45/02; B01D 19/0063; B01D 19/0057; F17D 1/005
See application file for complete search history.

(56) References Cited

U.S. PATENT DOCUMENTS

| 3,545,468 A | 12/1970 | Freeman et al. |
| 4,617,031 A | 10/1986 | Suh et al. |

(Continued)

FOREIGN PATENT DOCUMENTS

| CN | 1824390 | 8/2006 |
| CN | 204147714 | 2/2015 |
| WO | 2013091719 | 6/2013 |

OTHER PUBLICATIONS

Wang et al. "Gas-Liquid Cylindrical Cyclone (GLCC ©) Compact Separators for Wet Gas Applications" Proceedings of ETCE 2001 Engineering Technology Conference on Energy, published Feb. 2001 (Year: 2001).*

(Continued)

*Primary Examiner* — Stephen Hobson
(74) *Attorney, Agent, or Firm* — McAfee & Taft

(57) ABSTRACT

The present disclosure provides a gas-liquid flow separation system configured to separate a fluid stream containing both gas and liquid components into separate gas and liquid streams. The separation of the components permits the collection of data relating to the volume of each stream. In some embodiments, the separation system provides for the subsequent recombination of the streams in a homogeneous mixture for processing by downstream facilities. Also, the present disclosure provides a manifold system configured to receive fluid streams from a plurality of sources, combine the streams into a single blended stream containing both gas and liquid components. Subsequently, the system provides for separation of the gas from the liquid components and optional recombination of the same.

10 Claims, 10 Drawing Sheets

(51) Int. Cl.
  *B01D 45/02* (2006.01)
  *F17D 1/00* (2006.01)
(52) U.S. Cl.
  CPC .............. *B01D 45/02* (2013.01); *B01D 45/16* (2013.01); *F17D 1/005* (2013.01)

(56) References Cited

U.S. PATENT DOCUMENTS

| | | | |
|---|---|---|---|
| 5,112,479 | A | 5/1992 | Srimongkolkul |
| 5,407,584 | A | 4/1995 | Broussard, Sr. |
| 5,526,684 | A * | 6/1996 | Liu .................... B01D 19/0057 73/200 |
| 5,882,530 | A | 3/1999 | Chase |
| 6,197,188 | B1 | 3/2001 | Lamoureux |
| 6,210,575 | B1 | 4/2001 | Chase et al. |
| 6,383,262 | B1 * | 5/2002 | Marthinsen ............. E21B 43/34 95/254 |
| 6,790,256 | B2 | 9/2004 | Means |
| 7,594,941 | B2 | 9/2009 | Zheng et al. |
| 8,114,283 | B2 | 2/2012 | Parkinson |
| 8,568,515 | B2 | 10/2013 | Mantilla et al. |
| 2006/0086253 | A1 | 4/2006 | Gaur et al. |
| 2008/0087608 | A1 * | 4/2008 | Wang ................ B01D 19/0063 210/744 |
| 2012/0152122 | A1 | 6/2012 | Mantilla et al. |
| 2013/0319952 | A1 * | 12/2013 | Wolf ....................... B04C 11/00 210/741 |
| 2014/0251140 | A1 | 9/2014 | Sams et al. |
| 2015/0007532 | A1 | 1/2015 | Kira et al. |
| 2015/0300997 | A1 | 10/2015 | Kriel et al. |

OTHER PUBLICATIONS

Liu et al. "The flow downstream of a bifurcation of a flow channel for uniform flow distribution via cascade flow channel bifurcations" Applied Thermal Engineering 81 (2015) 114-127. (Year: 2015).*
Dong et al. "CFD analysis of a novel modular manifold with multi-stage channels for uniform air distribution in a fuel cell stack" Applied Thermal Engineering 124 (2017) 286-293. (Year: 2017).*
Dr. Ram S. Mohan and Dr. Ovadia Shoham; Design and Development of Gas-Liquid Cylindrical Cyclone Compact Separators for Three-Phase Flow; Semi-Annual Technical Progress Report; Apr. 29, 2002; pp. 1-36.
Shoubo Wang, et al.; Gas-Liquid Cylindrical Cyclone (GLCC) Compact Separators for Wet Gas Applications; Feb. 2001; pp. 1-11.
Carsten Mehring; Dispersed Two-Phase Flow In A Gas-Liquid Cylindrical Cyclone Separator; 2016; pp. 1-12; vol. 4., No. 1.
Miguel A. Reyes-Gutierrez, et al.; Eulerian-Eulerian Modeling of Disperse Two-Phase Flow In A Gas-Liquid Cyclindrical Cone; 2004; pp. 1-7.
G. E. Kouba, et al.; A Review of Gas-Liquid Cylindrical Cyclone (GLCC) Technology; 1996; pp. 1-25.
Dr. Ram S. Mohan, et al.; Design and Development of Gas-Liquid Cylindrical Cyclone Compact Separators for Three-Phase Flow; Final Technical Report; Jun. 25, 2003; pp. 1-46.
Lida Baghernejad, Development and Characterization of Ultra Lightweight, Highly Selective, Filter Media for Oil-Water Mixtures, 2015, pp. 1-253.
Sulzer Chemtech, Gas/Liquid Separation Technology, pp. 1-24, United States.

* cited by examiner

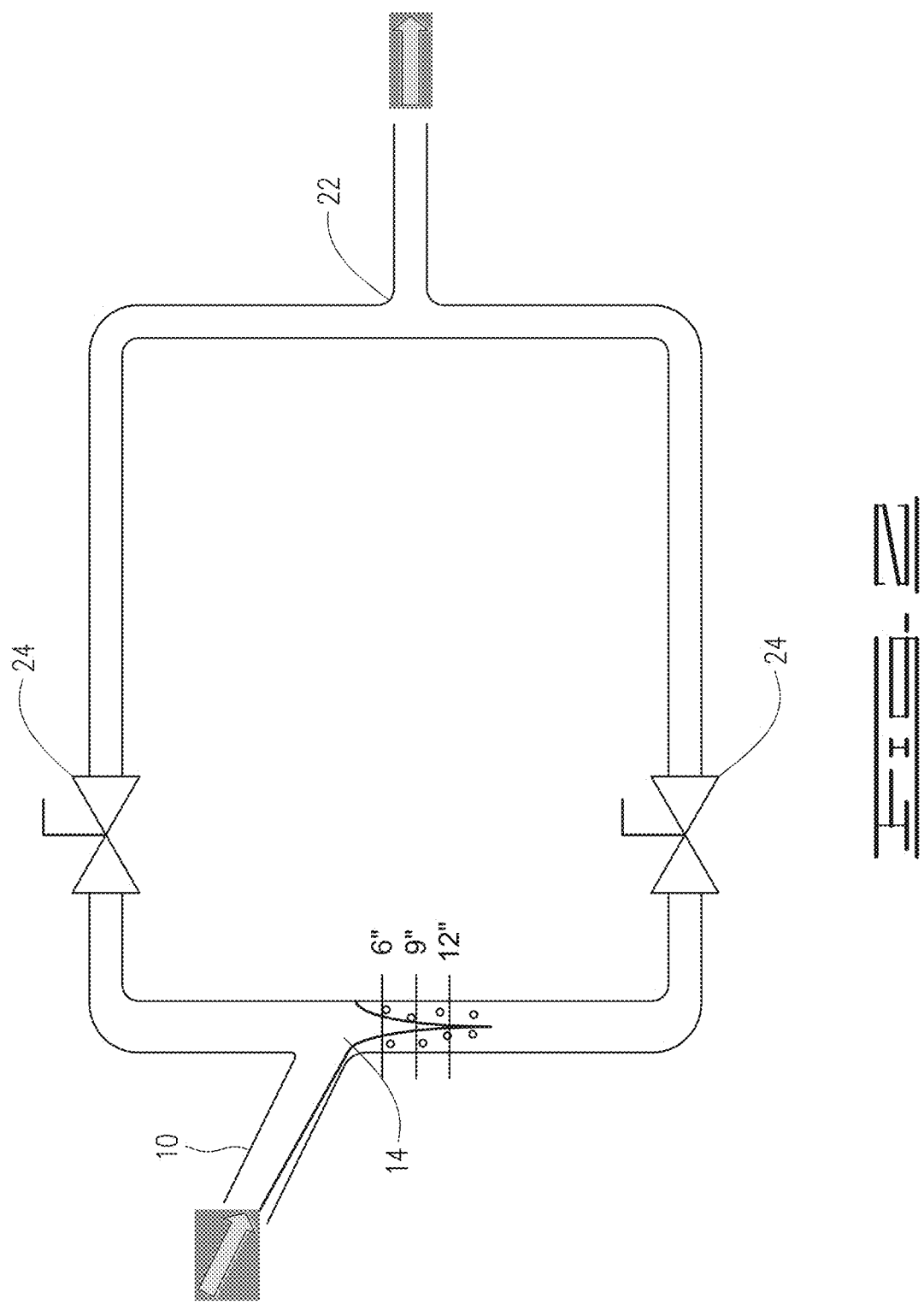

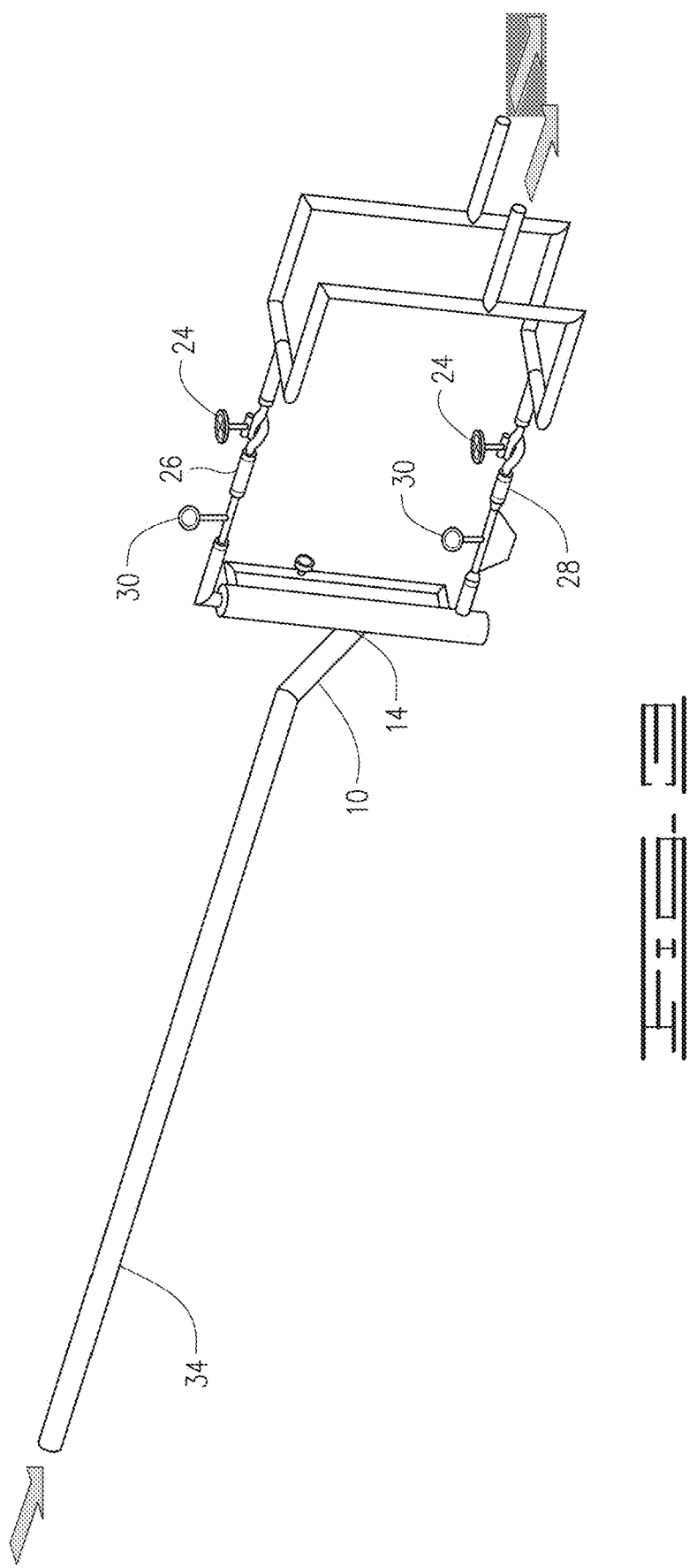

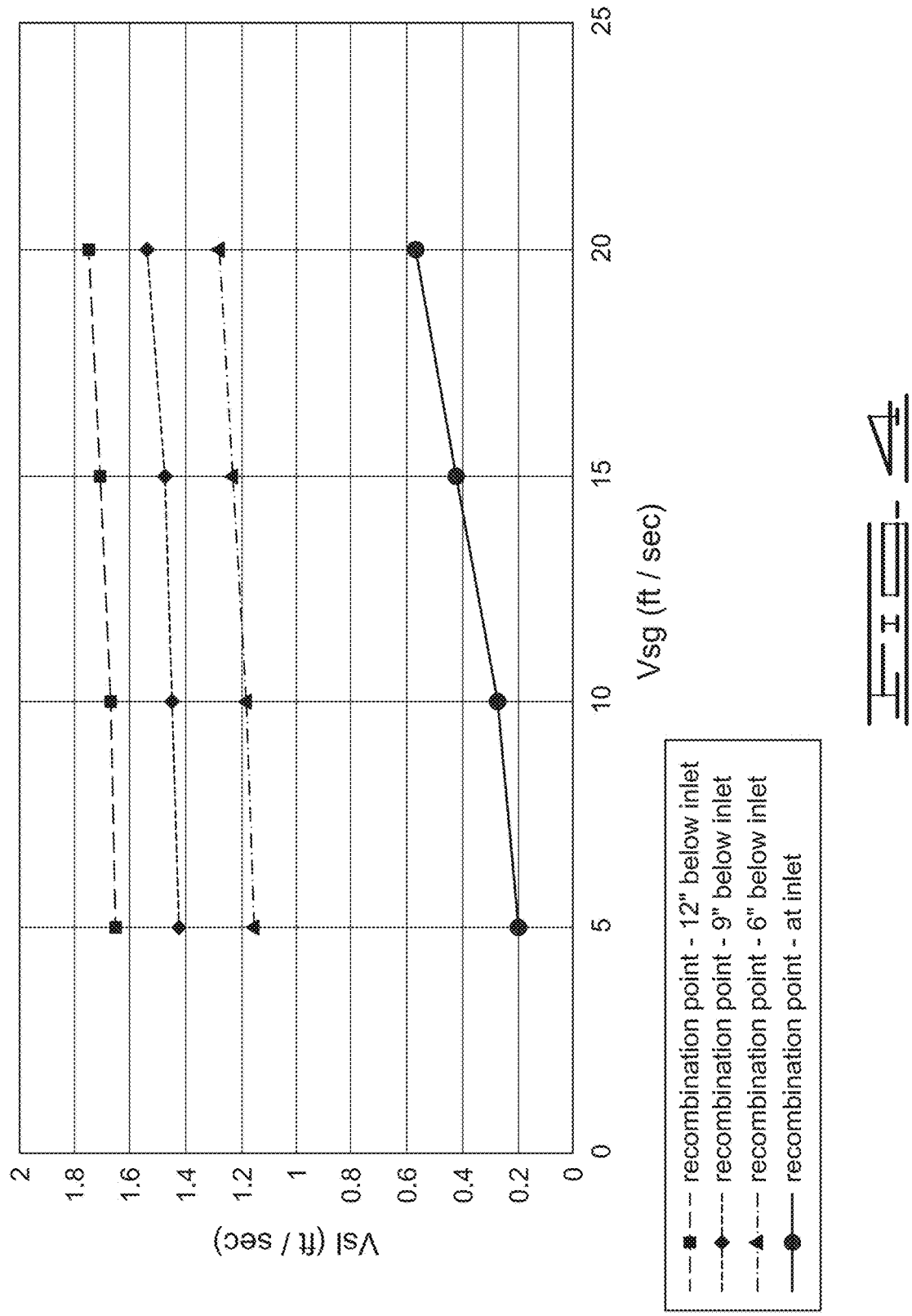

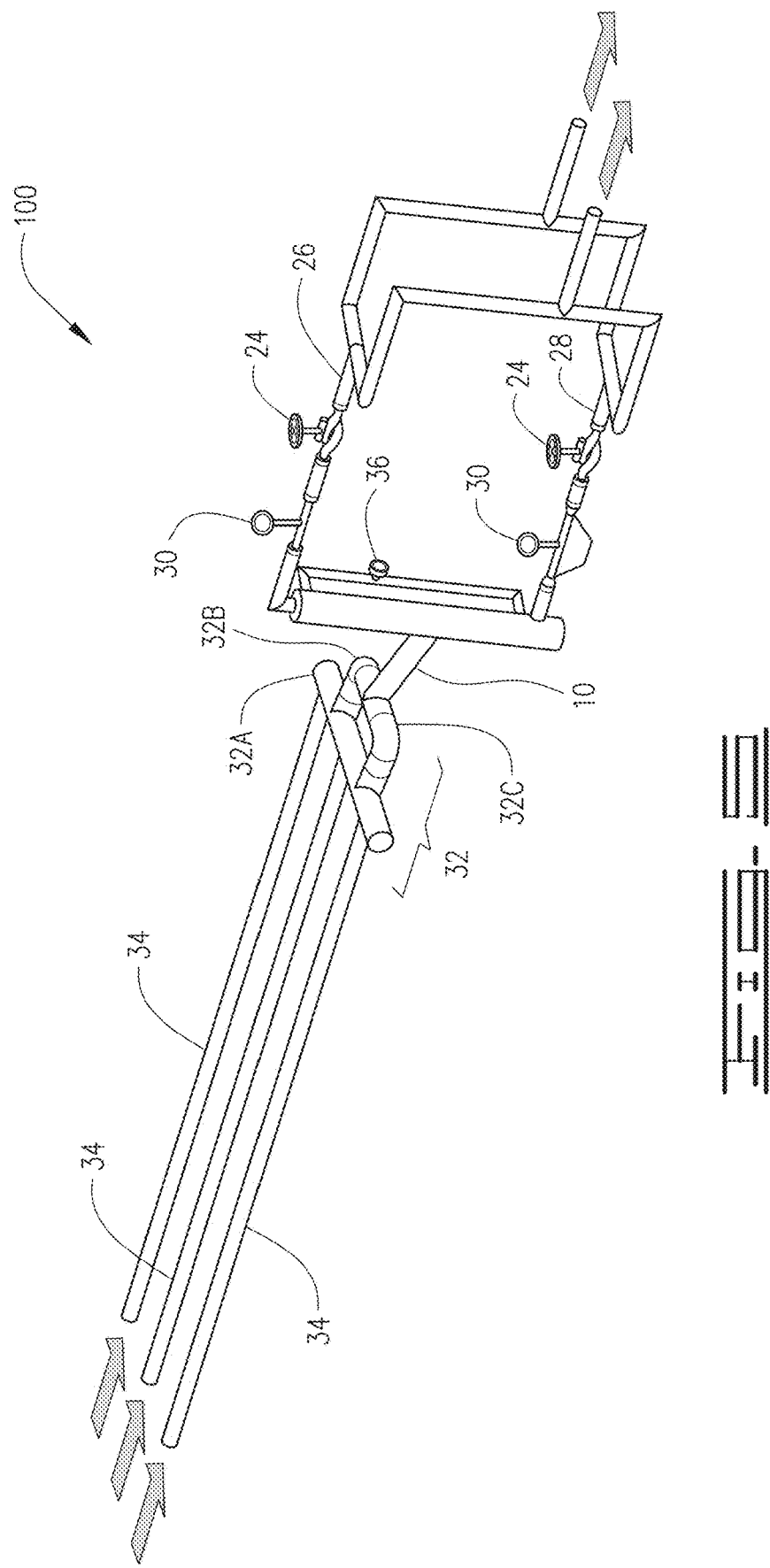

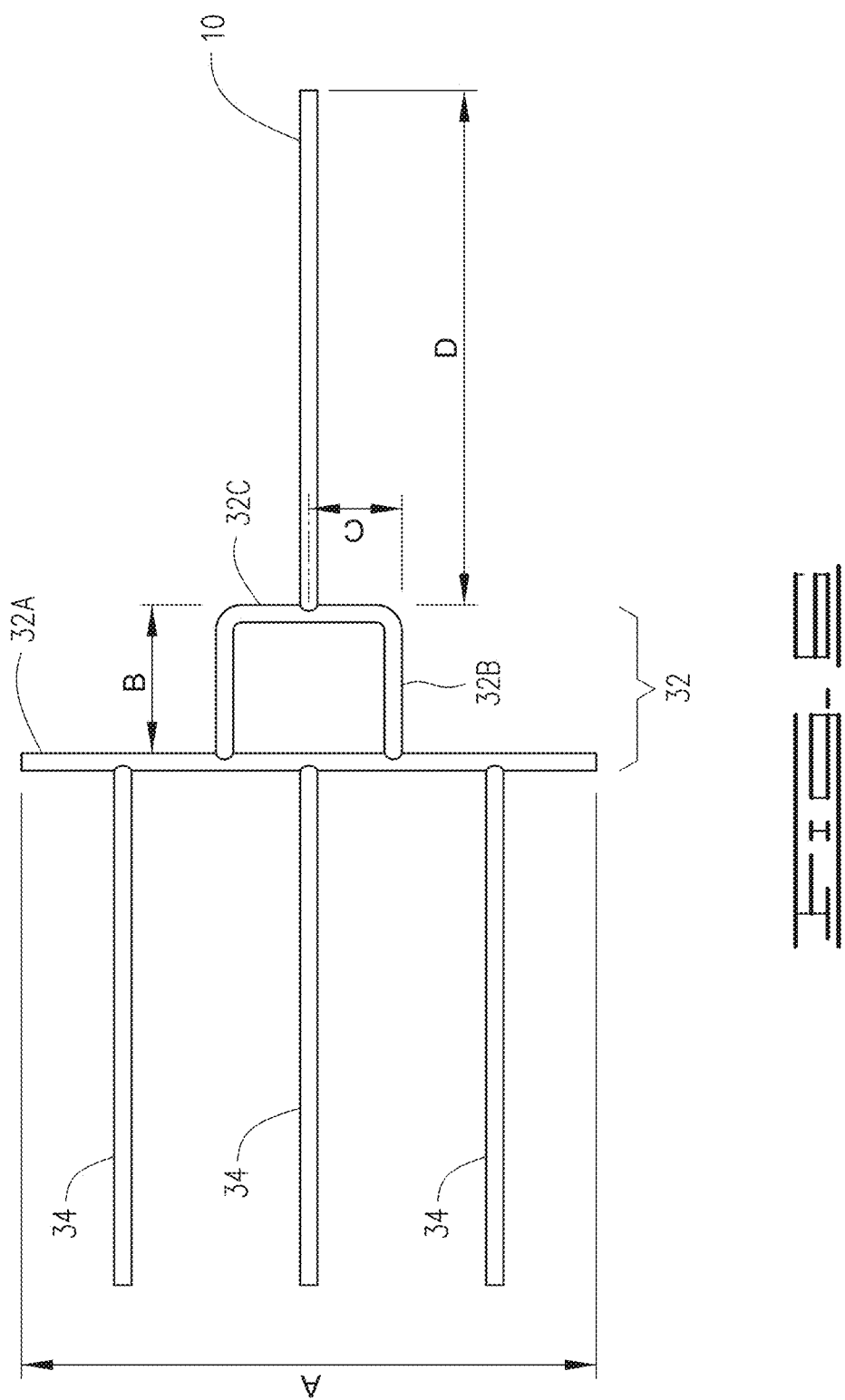

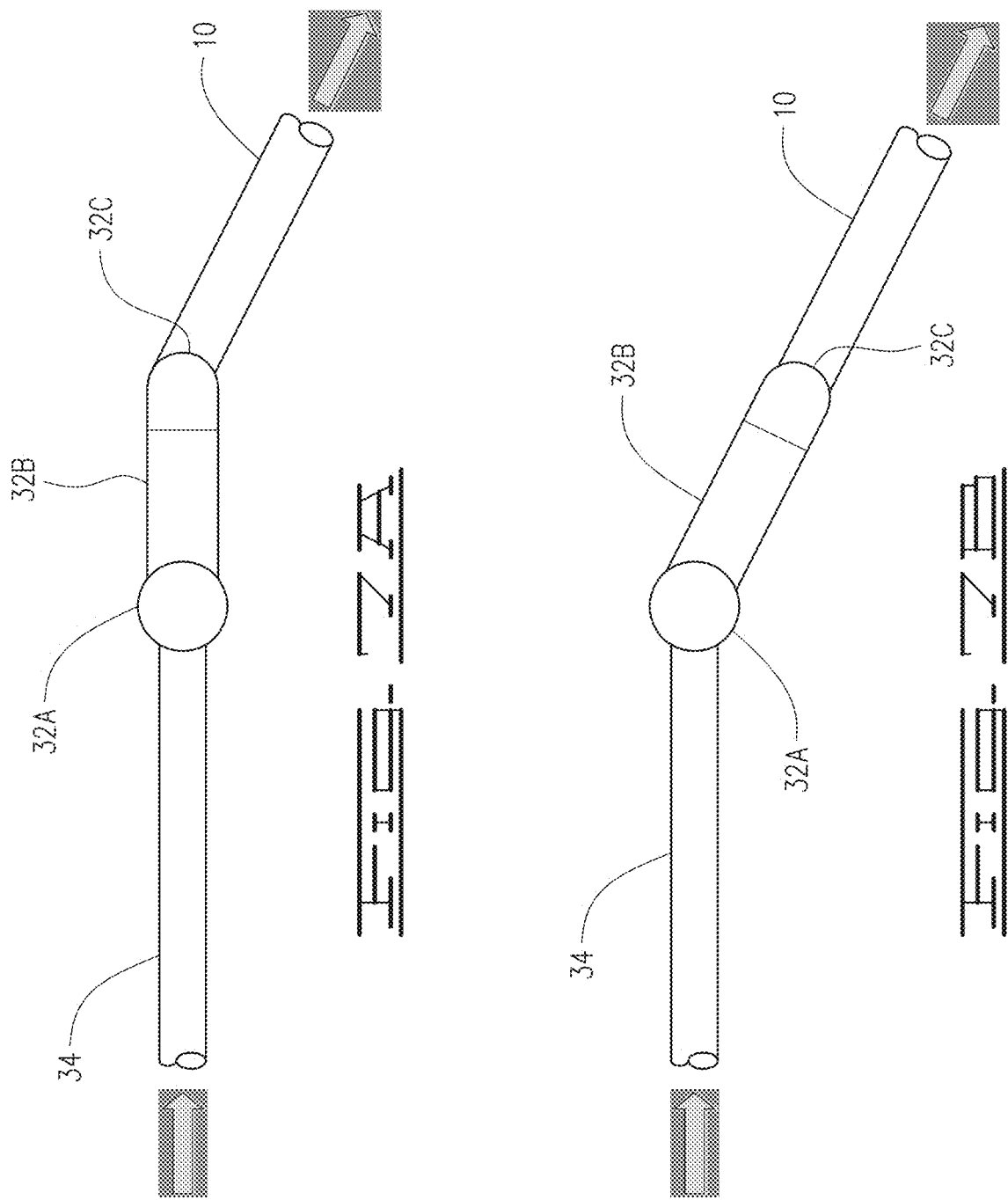

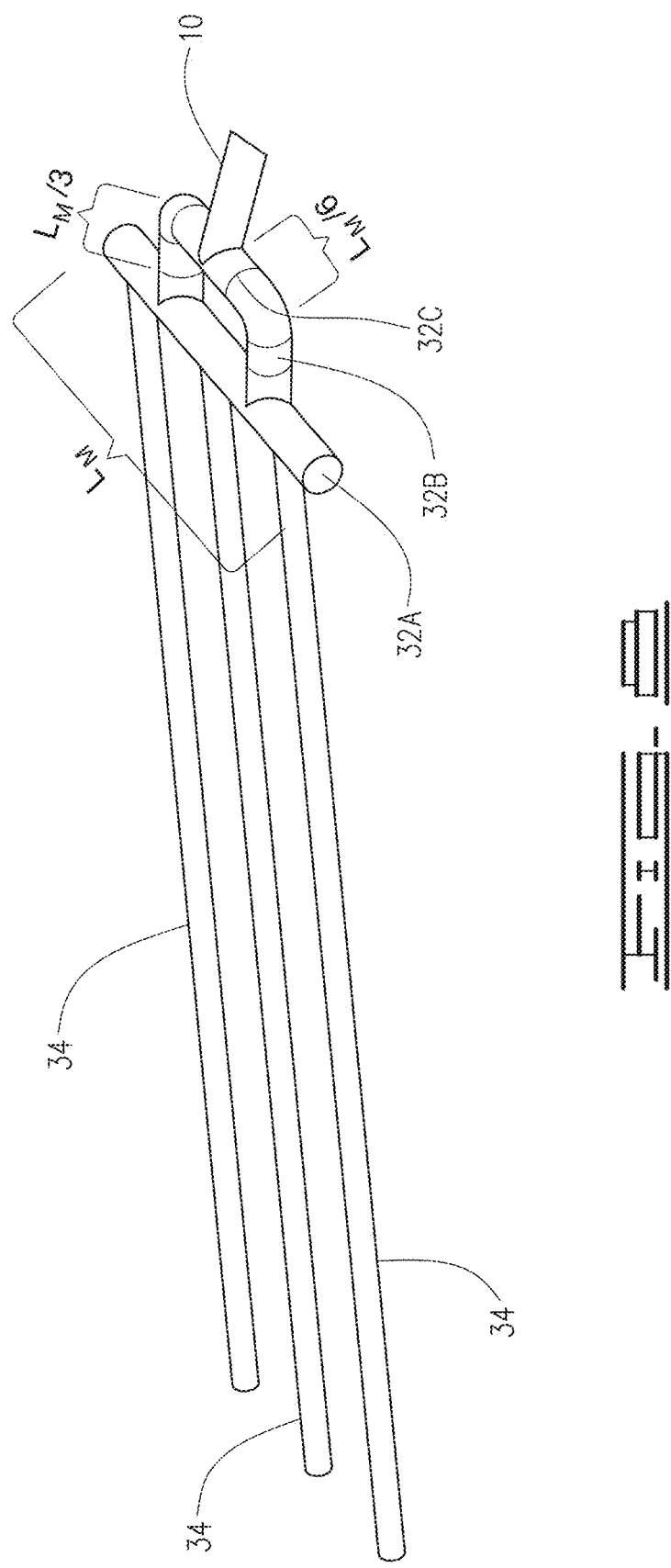

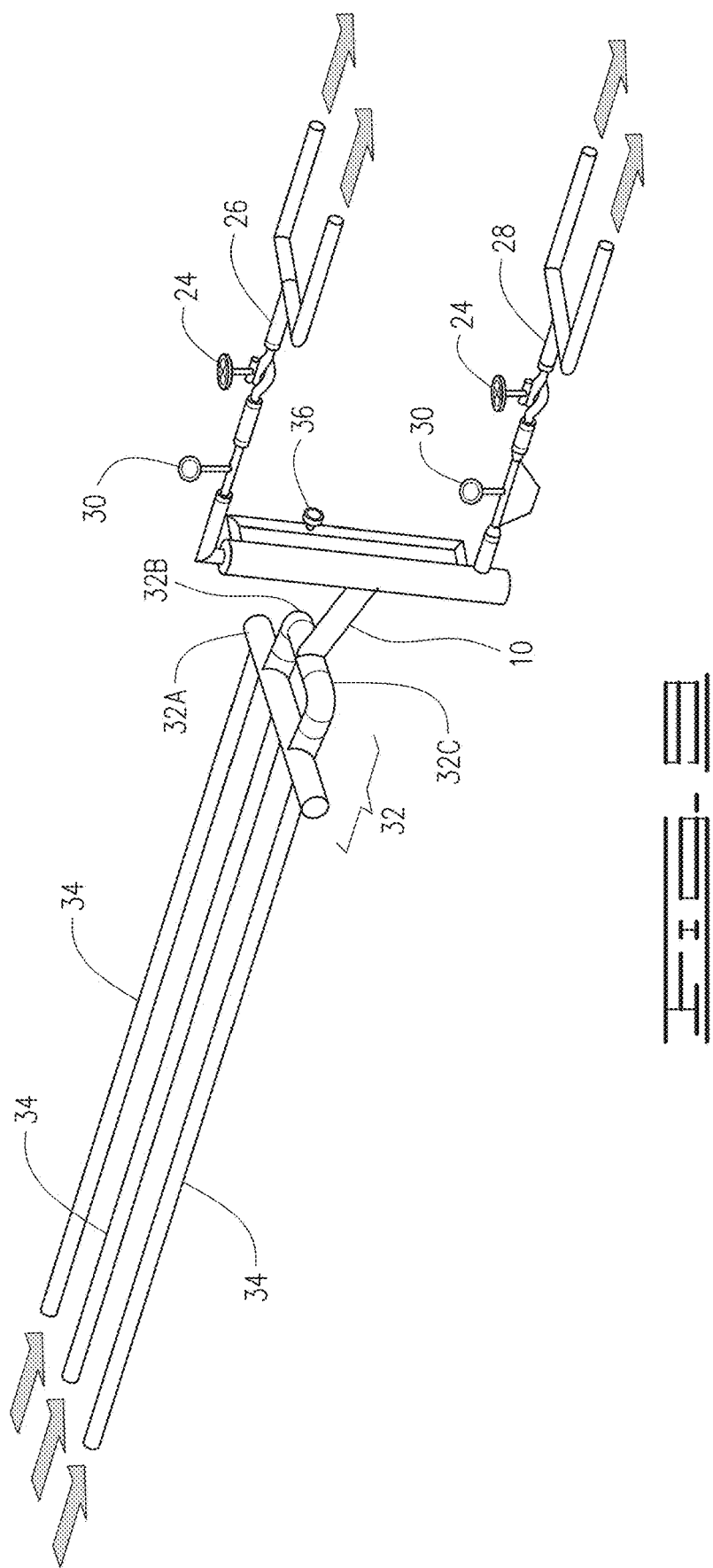

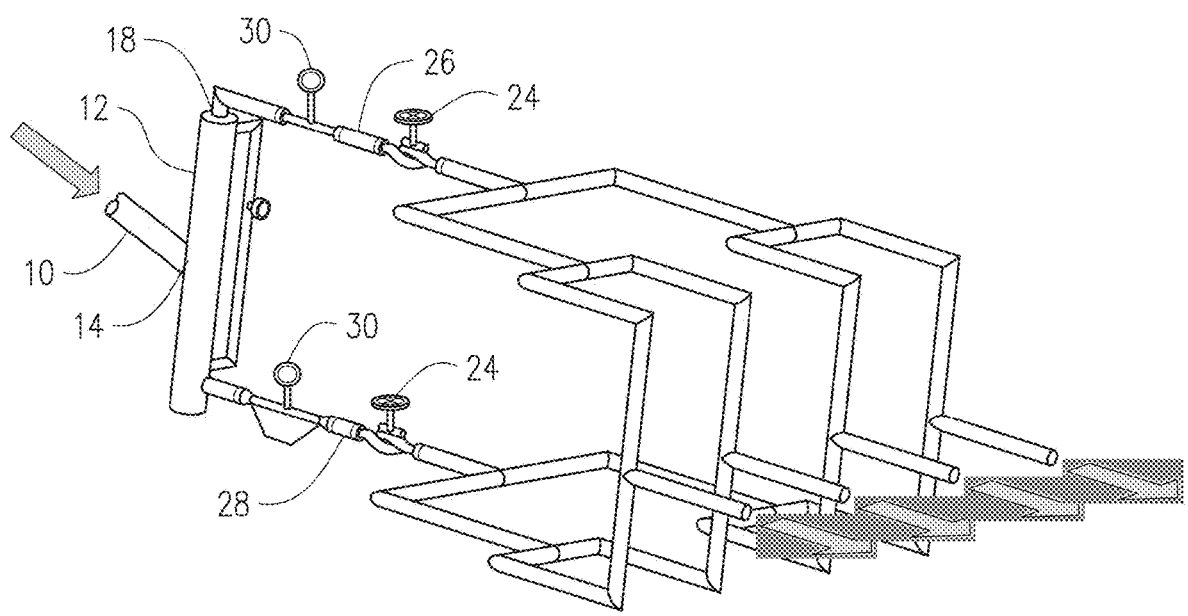
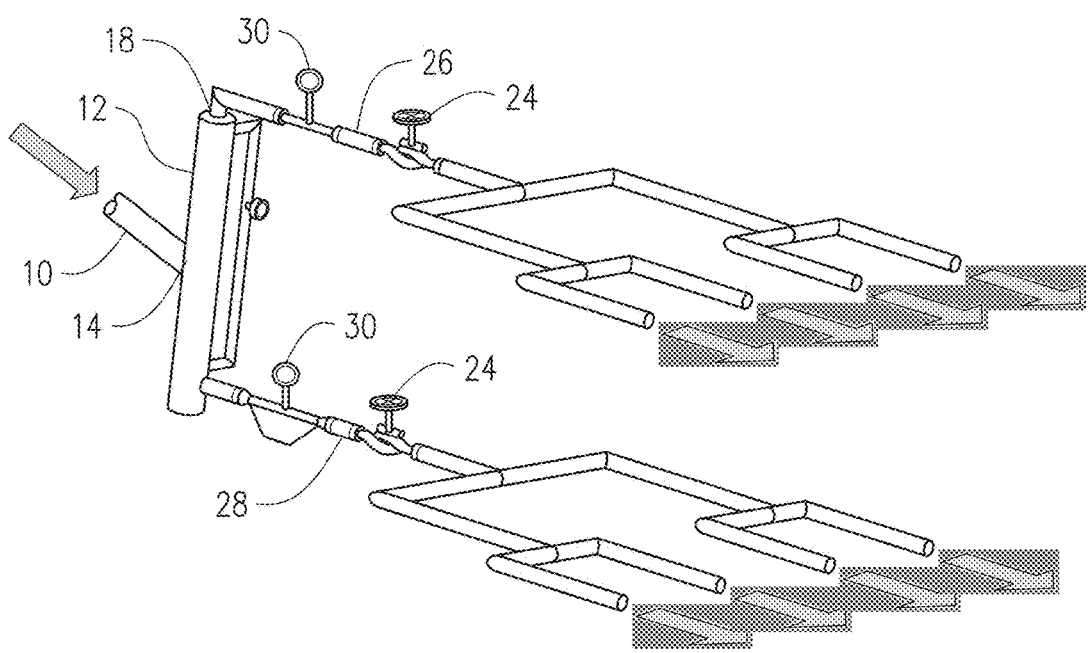

GAS—LIQUID FLOW SPLITTING (GLFS) SYSTEM

CROSS REFERENCE TO RELATED APPLICATIONS

This application claims priority and incorporates fully the disclosure of U.S. Provisional Application Ser. No. 62/598,096 filed Dec. 13, 2017, titled "Gas-Liquid Flow Splitting (GLFS) Device".

BACKGROUND

Tee configurations, such as impacting and branching tees, are widely applied in oilfield pipeline networks, production flowlines and refinery streams to split flows into several streams. Usually, equal splitting of the flow streams is preferable for proper operation of downstream facilities. However, multiphase flow is notorious for splitting unevenly while flowing through tee junctions. This results in unequal gas-oil ratio in the split streams, whereby some streams flow mainly liquid while others flow mainly gas. Thus, downstream facilities, such as separators, will experience operational difficulties, thereby lowering their efficiency. In production operations, manifolds are used for combining production from various pipelines, which operate under different flow conditions, and divide the total production into several outlets. However, such manifolds are large and have problems with slug dissipation leading to liquid carry-over into the outlet gas streams or gas carry-under into the liquid stream. Also, conventional manifolds require several valves in the manifold, as well as in the gas and liquid lines, in order to ensure equal distribution.

The improvement provided herein relates to a novel Gas-Liquid Flow Splitting (GLFS) system. The GLFS system incorporates a Gas-Liquid Cylindrical Cyclone (GLCC) based system, working on centrifugal and gravity forces to separate the gas and liquid phases. The configuration of the GLFS system allows the GLFS system to receive production from various pipelines operating under different conditions. The configuration of the GLFS system also ensures equal split of the gas-liquid multiphase flow production into downstream processing facilities.

SUMMARY

Disclosed herein is a separation system suitable for splitting a multiphase fluid flow into a gas and a liquid stream suitable for assessing the amount of each component in the multiphase fluid flow. The separation system includes an incoming fluid conduit joined by a tangential inlet to a cylindrical cyclone chamber. The cylindrical cyclone chamber has a lower liquid outlet and an upper gas outlet. A first gas flow line is in fluid communication with the upper gas outlet and a first liquid flow line is in fluid communication with the lower liquid outlet. A first secondary gas outlet and a second secondary gas outlet are in fluid communication with the first gas flow line. Additionally, a first secondary liquid outlet and a second secondary liquid outlet are in fluid communication with the first liquid flow line. The first secondary gas outlet and said first secondary liquid outlet are joined in fluid communication at a first recombination location. The first recombination location is at a lower elevation than the elevation where the tangential inlet joins to the cylindrical cyclone chamber. Likewise, the second secondary gas outlet and the second secondary liquid outlet are joined in fluid communication at a second recombination location. The second recombination location is located at a lower elevation than the elevation where the tangential inlet joins to the cylindrical cyclone chamber.

Also disclosed herein is an alternative separation system suitable separating a multiphase fluid into a gas and a liquid stream. This embodiment of the separation system includes a flow mixing manifold which receives and combines fluid flow from at least two inlet pipelines. The flow mixing manifold has an inlet portion which receives and blends fluids from the pipelines. The inlet portion has a cross-sectional area equal to the total cross-section area of all inlet pipelines. The flow mixing manifold also has at least one transition zone joining the inlet portion of the flow mixing manifold to a fluid conduit. The fluid conduit provides fluid communication between the transition zone and a cylindrical cyclone chamber. The cylindrical cyclone chamber has a lower liquid outlet and an upper gas outlet. The lower and upper outlet receive the separated components of the fluid that was originally transported by the inlet pipelines.

Also disclosed herein is a separation system comprising having a fluid conduit joined by a tangential inlet to a cylindrical cyclone chamber. The cylindrical cyclone chamber includes a lower liquid outlet and an upper gas outlet. In fluid communication with the upper gas outlet is a first gas flow line. In fluid communication with the lower liquid outlet is a first liquid flow line. First and second secondary gas outlets are in fluid communication with the first gas flow line. First and second secondary liquid outlets are in fluid communication with the first liquid flow line. A first control valve is positioned in the first gas flow line and a second control valve is positioned in the first liquid flow line. The control valves in the gas flow line and the liquid flow line, in conjunction with a pressure differential sensor, maintain the desired liquid level within the cylindrical cyclone chamber.

BRIEF DESCRIPTION OF THE DRAWINGS

FIGS. 1-3 depict one configuration of a GLFS system.

FIG. 4 depicts the limiting operating region when equilibrium liquid level exceeds the inlet height of the GLCC for various recombination locations.

FIGS. 5-7B depict another configuration of a GLFS system.

FIG. 8 provides a perspective view of a flow mixing manifold suitable for use in the disclosed GLFS systems.

FIG. 9 depicts an alternative configuration of a GLFS system.

FIGS. 10A-10B depict downstream outlet configurations.

DETAILED DESCRIPTION

Figure 1:
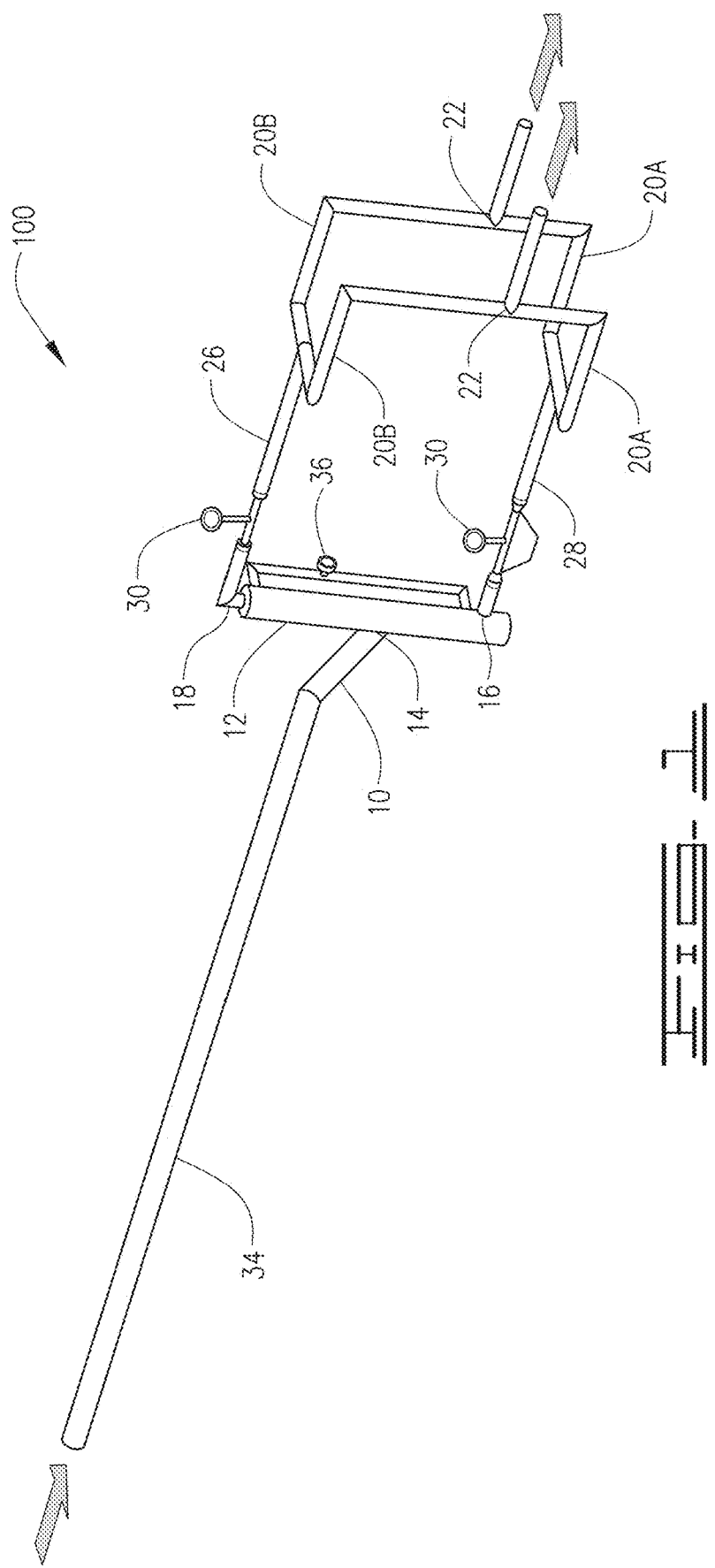

The present disclosure provides three GLFS system configurations. The different GLFS system configurations are adaptable to different field applications. The configurations provided are:

Configuration 1 (see FIGS. 1-3)—This configuration offers an effective splitting of a single multiphase pipeline, with a near equal splitting of the gas and liquid phases in the downstream lines. Configuration 1 is particularly suited for steam distribution system in enhanced oil recovery operations and wet gas applications.

Configuration 2, presented in FIGS. 5-7B, is an attractive and compact alternative to conventional manifold devices, which are bulky and operate with less probability of equal splitting at their outlets. Thus, in the configuration of FIG. 5, the GLFS system replaces a conventional manifold system, which has multiple inlets.

Configuration 3 as depicted in FIG. 9 provides a GLFS system configured to completely separate the gas and liquid phases of an incoming fluid stream. As shown in FIG. 9, the gas and liquid secondary outlets are not recombined, but rather flow in separate lines to the downstream facilities. Either multiple inlet pipelines connected to an improved flow mixing manifold (as in configuration 2, FIG. 5) or one inlet multiphase pipe line (as in configuration 1, FIG. 1) can be utilized in this configuration.

GLFS system 100 of FIGS. 1-3 includes a multiphase flow pipeline 34 connected to a GLCC 12 by pipe 10. Pipe 10 connects to GLCC 12 at an angle between about 25° and 30° and includes a tangential inlet nozzle 14 with an opening of 25% to 30% of the cross-sectional area of pipe 10. The connection angle of pipe 10 and inlet nozzle 14 cooperate to create a swirling centrifugal force inside GLCC 12. The centrifugal action within GLCC 12 separates the liquid and gas components from one another. GLCC 12 has a lower outlet 16 and an upper outlet 18. Following separation of the components, the liquid component exits GLCC 12 through lower outlet 16 and the gas component exits GLCC 12 through upper outlet 18. The liquid and gas components may be distributed into equal numbers of secondary liquid outlets 20A and secondary gas outlets 20B. Equal splitting of single-phase gas or liquid can be accomplished more reliably, as compared to two-phase flow splitting.

FIG. 1 also depicts the recombination of gas and liquid secondary outlets 20A, 20B at recombination locations 22. Recombination location 22 will always be lower than the elevation where nozzle 14 joins to GLCC 12. Thus, the recombination location 22 acts as passive control system keeping the liquid level within GLCC 12 below the junction of inlet nozzle 14 with the GLCC 12.

FIG. 4 depicts a plot of the condition of superficial liquid and gas velocities at which the equilibrium liquid level in GLCC 12 rises above the junction of inlet nozzle 14 with GLCC 12 for different recombination locations. The data in FIG. 4 was collected using a 3" ID single inlet and GLCC having a 3" ID. The GLCC 12 extends 3 feet above and 4.4 ft below the junction of inlet nozzle 14 with GLCC 12. Maintaining the equilibrium liquid level, at or near the height of inlet nozzle 14 limits the operational region of GLCC 12 for liquid carry-over. However, by positioning recombination location 22 at a position lower than the elevation of inlet nozzle 14, the operational region of GLCC 12, with regard to a liquid carry-over perspective, increases significantly as can be seen from FIG. 4. In view of FIG. 4, the maximum increase in the operational region was achieved when recombination location 22 is positioned six inches below the junction of inlet nozzle 14 with GLCC 12.

FIG. 4 schematically depicts the impact of altering the position of recombination location 22 on the height of the liquid level within GLCC 12. Continued lowering of recombination location 22 does not produce continued significant improvement to the operational region of GLCC 12. In fact, excess lowering of liquid level within GLCC 12 may lead to gas carry-under from GLCC 12 through outlet 16 due to lowered vortex height. Accordingly, in typical configurations of GLFS system 100, recombination location 22 will be located six inches to one foot below the height of the junction of inlet nozzle 14 and GLCC 12. Such a location will ensure proper separation of gas and liquid components while minimizing gas carry-under and liquid carry-over.

Following separation, the gas and liquid components are transported to individual downstream processing facilities. As a result of the disclosed configuration, GLFS system 100 enables nearly equal splitting of two-phase flow containing incoming gas and liquid components into single phase flow to permit assessment of the relative volumes of each component using meters 30 located in the single-phase gas flow line 26 and liquid flow line 28. Additionally, GLFS system 100 provides for recombination of the gas and liquid components in a controlled manner.

FIG. 3 depicts a modification of GLFS system 100. In this configuration, control valves 24 are located in single-phase gas flow line 26 and liquid flow line 28. Control valves 24 in conjunction with a suitably programmed controller, not shown, manage the liquid level in the GLCC 12. In the embodiment of FIG. 3, the separated gas and liquid can again be recombined at any location downstream of the control valves followed by transportation of resulting mixture to downstream processing facilities. Thus, the configuration of FIGS. 1-3 provides the ability to accurately determine the volumes of gas and liquid passing through the GLFS system.

FIGS. 5 and 6 depict an alternative embodiment of GLFS system 100. With reference to FIGS. 5 and 6, like components will be identified with like reference numbers as provided in FIGS. 1-3.

GLFS system 100 of FIGS. 5 and 6 may be used to replace conventional manifold systems. As depicted in FIG. 5, GLFS system 100 includes an improved flow mixing manifold 32 installed upstream of the GLCC. Flow mixing manifold 32 combines production from various pipelines 34 operating under different flow conditions. Multiphase fluid from pipelines 34 enters flow mixing manifold 32 which combines the multiple fluid flows into a single fluid stream and passes the combined fluid stream into GLCC 12. As depicted in FIG. 5, the components downstream of GLCC 12 correspond to the components discussed in connection with Configuration 1 and depicted in FIGS. 1-3. Thus, GLCC 12 of Configuration 2 operates in the same manner as discussed above with regard to Configuration 1. Likewise, the optional use of control valves 24 may be incorporated in the embodiment of Configuration 2 as depicted in FIG. 5.

Flow mixing manifold 32 of Configuration 2 overcomes deficiencies of currently available two-phase flow mixing manifolds. Previous manifolds typically utilize large diameter tubulars to ensure two-phase flow stratification in order to avoid liquid carry-over to the gas outlets. Additionally, previous manifolds generally have a length sufficient to achieve complete slug dissipation. Further, current manifolds require utilization of several valves in the gas and liquid outlets to prevent gas carry-under and liquid carry-over. As a result, flow control in systems utilizing currently available manifolds is overly complicated.

To overcome the problems of currently available manifolds, flow mixing manifold 32 is tailored to the incoming pipelines. Specifically, the inlet portion 32A of flow mixing manifold 32 has a cross-sectional area that equals the total cross-sectional area of all inlet pipelines 34. To provide the desired inlet manifold diameter at inlet portion 32A one may use the following equation:

$$D_M = \sqrt{\Sigma_{Inlet=1}^{n} D_{Inlet}^2} \quad (1)$$

where $D_M$ is the diameter of the manifold, $D_{Inlet}$ is the individual diameters of inlet pipelines 34, and n is the number of inlet pipelines 34.

With the diameter of inlet portion 32A corresponding to the total area of inlet pipelines, the overall mixing manifold length can be as small as possible as stratification within mixing manifold 32 is not necessary. Rather, stratification may occur within the downward incline portion of pipe 10 or within GLCC 12. Thus, overall length for mixing manifold 32 may be determined by addressing the scenario where liquid slug bodies simultaneously flow from inlet pipelines 34 into mixing manifold 32. For this situation, the total volume of inlet portion 32A and transition zones 32B and 32C are included when determining the total volume of mixing manifold 32.

To manage this situation, mixing manifold 32 should contain at least as much volume as the total volume of slug bodies passing simultaneously from inlet pipes 34 into mixing manifold 32. Overall inlet portion manifold length $L_M$ is indicated as distance A in FIG. 6 can be determined as described below.

In equation 2 below, $L_M$ is the length of the manifold inlet portion, $A_{Inlet}$ and $A_M$ are the areas of the inlet pipelines 34 and manifold inlet portion 32A respectively.

$$L_M = \frac{\sum_{Inlet=1}^{n}(L_{S,Inlet}A_{Inlet})}{A_M} \quad (2)$$

The slug length of an inlet pipe can be determined using equation 3 where $L_{S,Inlet}$ is the slug length in each inlet pipeline 34.

$$L_{S,Inlet}=\exp(-25.4+28.5[\ln(D_{Inlet})]^{0.1}) \quad (3)$$

After substituting $L_{S,Inlet}$ in Equation 2 and some rearrangements, the manifold length can be determined by using equation 4 below.

$$L_M = \frac{\sum_{Inlet=1}^{n}(\exp(-25.4+28.5[\ln(D_{Inlet})]^{0.1})D_{Inlet}^2)}{D_M^2} \quad (4)$$

In equations 3 and 4, the dimension of $D_{inlet}$ are in inches and dimensions $L_{S,Inlet}$ and $L_m$ are in feet.

To aid in the further understanding of Configuration 2, FIG. 6 provides a top schematic view of this embodiment of GLFS system 100 and FIG. 8 provides a perspective view of the relative components of mixing manifold 32. In one embodiment, the diameters of manifold inlet portion 32A, transition zones 32B and 32C and pipe 10 are identical. The volume of liquid in 32A having length $L_M$ will equal the volume of liquid in transition zone areas 32B and 32C. On this basis, the length of transition zone portion 32B, indicated as distance B, will equal $L_M/3$, and transition zone portion 32C, indicated as distance C, will have a length of $L_M/6$. Further, the length of pipe 10, indicated as distance D, should equal the length of manifold inlet portion 32A ($L_M$). Thus, the volume of pipe 10 will equal the volume of manifold inlet portion 32A.

The configuration of GLFS system 100 depicted in FIGS. 5-7B provides the advantageous option of eliminating the use of valves 24 to maintain the liquid at a desired level in GLCC 12. As depicted GLFS system 100 combines two-phase flow from a plurality of pipelines 34 and delivers the flow to mixing manifold 32. Mixing manifold 32 includes inlet portion 32A and two transition zones 32B and two transition zones 32C. Transition zones 32B, 32C may be horizontal or may be inline with pipe 10. Thus, transition zones 32B, 32C may be inclined at an angle of 25°-30°. Transition zones 32C recombine the flowing liquid at their junction with pipe 10. Inlet pipe 10 of the GLCC is designed to have the same diameter of the cumulative diameters of pipes 34 of manifold 32. The configuration with a downward incline of transition zones 32B, 32C aids in the discharge of fluid from mixing manifold 32 thereby avoiding the accumulation of gas and liquid in mixing manifold 32. As a further advantage, the downward incline leads to fluid pre-separation before entering the GLCC 12 thereby facilitating better phase separation.

FIG. 9 depicts Configuration 3 of GLFS system 100. Configuration 3 of GLFS system 100 uses valves 24 to maintain the liquid at the desired level in the GLCC 12 thereby providing for the complete separation of the gas and liquid phases of an incoming fluid stream. As depicted in FIG. 9, gas flow line 26 branches into secondary gas outlets 20B and liquid flow line 28 branches into secondary liquid outlets 20A; however, the secondary outlets 20A, 20B are not recombined in Configuration 3. Rather, the separated components are allowed to flow as single-phase streams to downstream processing facilities. In Configuration 3, either multiple pipelines 34 may flow into mixing manifold 32, as in Configuration 2 or a single multiphase pipeline 34 may connect to pipe 10.

The downstream secondary outlet configuration of FIG. 10 may be adapted for use with Configuration 1 (FIGS. 1-3), Configuration 2 (FIGS. 5-8) and Configuration 3 (FIG. 9). For all the possible configurations of GLFS system 100, control valves 24 may be installed in gas flow line 26 and liquid flow line 28. Control valves 24 are connected to a sensor 36 that indicates the liquid level in GLCC 12. Typically, sensor 36 will be a differential pressure transducer associated with GLCC 12 in a manner suitable for comparing the pressure at the lower end of GLCC 12 to the upper end of GLCC 12. Control valves 24 in conjunction with differential pressure transducer 36 maintain the liquid level in GLCC 12 between six inches and one foot below the GLCC inlet nozzle 14 thereby avoiding gas carry-under into liquid flow line 28 and liquid carry-over into gas flow line 26. As discussed above, recombination location 22 will typically be lower than inlet nozzle 14 to maintain the liquid level of GLCC 12 below the level of inlet nozzle 14 and to ensure proper separation of gas and liquid. This arrangement works like a "U-tube manometer" to help control the liquid level in the GLCC.

Each configuration of GLFS system 100 enhances the ability to measure the liquid and gaseous components of produced fluid streams. Mixing manifold 32, when installed upstream of GLCC 12, provides an improved blending of production products provided by a plurality of pipelines 34 under different flow conditions to GLCC 12. The configuration of pipe 10, inlet nozzle 14, GLCC 12 and recombination location 22 render control valves 24 optional and provides nearly equal pressure downstream. Equalization of pressure downstream of GLCC 12 prevents carry-under of gas into the liquid stream and carry-over of liquid into the gas stream.

Other embodiments of the present invention will be apparent to one skilled in the art. As such, the foregoing description merely enables and describes the general uses and methods of the present invention. Accordingly, the following claims define the true scope of the present invention.

What is claimed is:

1. A separation system comprising:
   a flow mixing manifold, said flow mixing manifold receiving and combining fluid flow from at least two inlet pipelines;
   said flow mixing manifold having an inlet portion which receives fluids from said pipelines, said inlet portion has a cross-sectional area equal to the total cross-section area of all inlet pipelines;
   at least one transition zone joining said inlet portion of said flow mixing manifold to a fluid conduit;
   said fluid conduit joined by a tangential inlet to a cylindrical cyclone chamber, said cylindrical cyclone chamber having a lower liquid outlet and an upper gas outlet;
   a first gas flow line in fluid communication with said upper gas outlet;
   a first liquid flow line in fluid communication with said lower liquid outlet;
   a first secondary gas outlet and a second secondary gas outlet in fluid communication with said first gas flow line;
   a first secondary liquid outlet and a second secondary liquid outlet in fluid communication with said first liquid flow line;
   said first secondary gas outlet and said first secondary liquid outlet joined in fluid communication at a first recombination location, said first recombination location is at a lower elevation than the elevation where said tangential inlet joins to said cylindrical cyclone chamber;
   said second secondary gas outlet and said second secondary liquid outlet joined in fluid communication at a second recombination location, said second recombination location is located at a lower elevation than the elevation where said tangential inlet joins to said cylindrical cyclone chamber; and,
   said first recombination location and said second recombination location are at the same elevation.

2. The separation system of claim 1, further comprising:
   a first flow meter positioned on said first gas flow line and a second flow meter positioned on said first liquid flow line.

3. The separation system of claim 1, wherein said first recombination location of said first secondary gas outlet and said first secondary liquid outlet is from about six inches to about eighteen inches lower than the elevation of said tangential inlet.

4. The separation system of claim 1, wherein said second recombination location of said second secondary gas outlet and said second secondary liquid outlet is from about six inches to about eighteen inches lower than the elevation of said tangential inlet.

5. The separation system of claim 1, further comprising a differential pressure sensor associated with said cylindrical cyclone chamber, said differential pressure sensor associated with said cylindrical cyclone in a manner which permits comparing the pressure at a lower end of the cylindrical cyclone chamber to the pressure at an upper end of the cylindrical cyclone chamber.

6. The separation system of claim 1, further comprising:
   a first control valve positioned in said first gas flow line and a second control valve positioned in said first liquid flow line.

7. The separation system of claim 1, wherein said inlet portion of said flow mixing manifold, said transition zone and said fluid conduit have identical diameters.

8. The separation system of claim 1, wherein the volume of said inlet portion will equal the volume of said transition zone.

9. The separation system of claim 1, wherein the length of said fluid conduit equals the length of said inlet portion.

10. The separation system of claim 1, wherein said fluid conduit has a diameter equal to the cumulative diameters of said inlet pipelines.

* * * * *